I. ZWISLER.
MACHINE FOR WRAPPING RUBBER TUBES.
APPLICATION FILED APR. 26, 1915.
1,230,262.
Patented June 19, 1917.
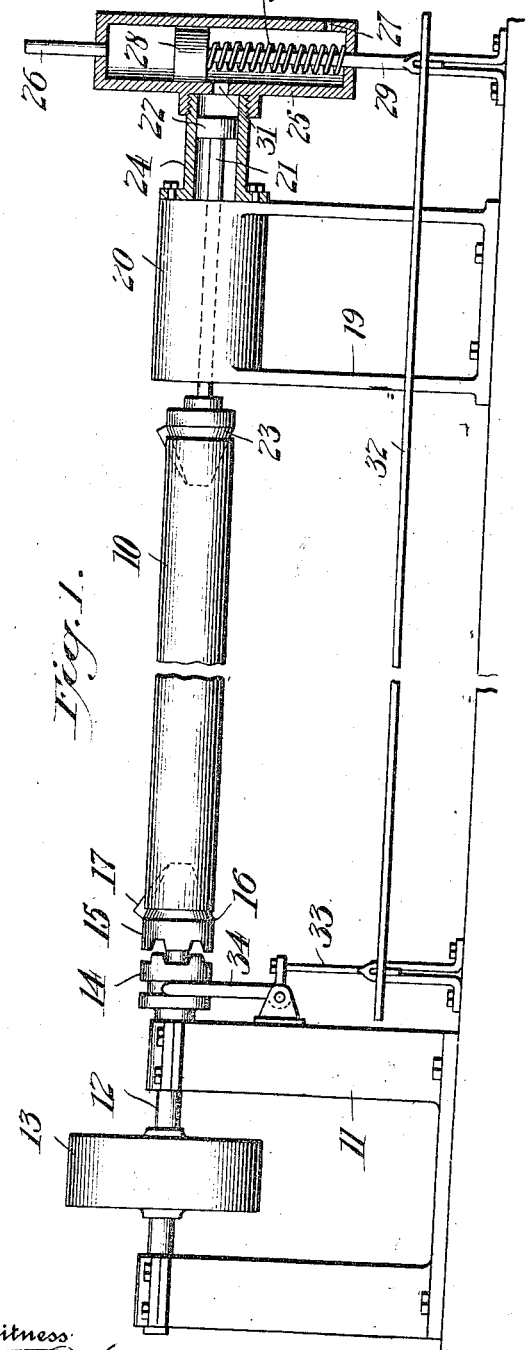
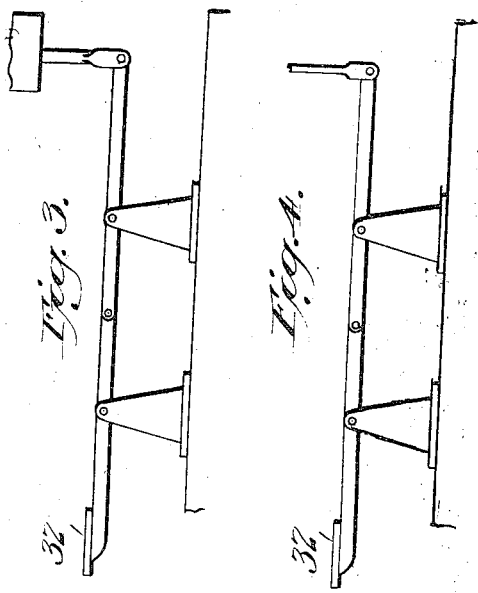
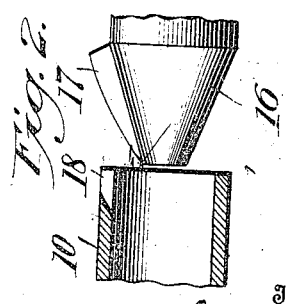
Witness
Inventor
I. Zwisler
By
Attorney

UNITED STATES PATENT OFFICE.

IRVIN ZWISLER, OF EAST PALESTINE, OHIO, ASSIGNOR TO THE McGRAW TIRE & RUBBER COMPANY, OF EAST PALESTINE, OHIO, A CORPORATION OF OHIO.

MACHINE FOR WRAPPING RUBBER TUBES.

1,230,262.     Specification of Letters Patent.     Patented June 19, 1917.

Application filed April 26, 1915. Serial No. 24,097.

*To all whom it may concern:*

Be it known that I, IRVIN ZWISLER, a citizen of the United States, residing at East Palestine, in the county of Columbiana and State of Ohio, have invented certain new and useful Improvements in Machines for Wrapping Rubber Tubes; and I do hereby declare the following to be a full, clear, and exact description of the invention, such as will enable others skilled in the art to which it appertains to make and use the same.

My invention relates to machines for wrapping fabric upon rubber tubes. Its object is to provide a machine which will firmly and uniformly wrap a fabric envelop about a tube, such as an inner tube for tires. To this end it comprises the combinations and details set forth in the appended claims.

In the drawings:—

Figure 1 is a side elevation partly in section;

Fig. 2 is a sectional detail; and

Figs. 3 and 4 are details of the treadle mechanism.

In the accompanying drawings 10 represents a hollow pipe or tube-mandrel such as is commonly used as a base for wound layers of rubber in making rubber tubes. 11 represents standards in which is journaled the shaft 12 carrying a pulley 13 which rotates the shaft. The shaft carries at one end a clutch member 14 slidably mounted upon its shaft but keyed thereto which engages a clutch member 15 provided with a cone-bearing 16. The member 15 is rotatably mounted upon the end of the shaft 12. The cone-bearing has a rib or key 17 which takes into a slot 18 in one end of the tube-mandrel 10, to enable power to be imparted from the shaft 12, the clutch members 14, 15 and the cone-bearing 16 to the mandrel 10. At the opposite end of the machine are a pair of standards 19 which carry a heavy sleeve or cylindrical block 20 through which plays a piston rod 21 with a piston-head 22, the rod carrying at one end a cone-bearing 23 adapted to enter one end of the mandrel 10. In the drawings I have shown a key on the cone bearing 23. This is a construction which may be employed but in many cases I prefer to omit the key which is not necessary at this end of the machine. The piston 22 reciprocates in a cylinder 24 bolted to the sleeve 20 and having threaded to it at the opposite end an upright cylinder 25. 26 represents an air inlet pipe and 27 an air outlet. 28 represents a piston-valve playing in the cylinder 25 and operated by a piston rod 29 which is encircled within the cylinder by a spring 30. At 31 is shown an opening which may be alternately inlet and outlet between the cylinders 24 and 25.

32 represents a treadle operating by connecting arms, at one end the piston rod 29 and at the other end a rod 33 which serves to oscillate an arm 34 to shift the clutch member 14.

In the use of the machine one end of the mandrel-tube is put in place so that the slot 18 takes over the key 17 of the cone-bearing 16. The cone-bearing at the other end is first pushed back and then introduced in place. The operator then steps on the treadle throwing into engagement the clutch members 14, 15, and at the same time pulling down the piston 28 in the cylinder 25, permitting the air to come through the passage 31 into the cylinder against the piston 22, forcing out the cone-bearing 23 into a close engagement with the mandrel during the operation. When it is desired to stop, the foot is taken off the treadle 32 whereupon the spring 30 throws the piston 28 to the upper part of the cylinder 25, opening the passage 31 to the exhaust 27 and freeing the piston 22 from pressure so that the cone-bearing 23 may readily be removed and the mandrel 10 taken away with its strongly wound fabric envelop upon the rubber tube. I may employ a comparatively light spring which, when the piston 22 is freed from air pressure, may draw back the cone bearing 23.

In the production of rubber tubes it is necessary that they should be firmly and uniformly wrapped by a fabric so that when they are cured there may be no expansion of the rubber tube under heat. If the fabric were not wrapped with uniform required pressure the tendency of the tube would be to sag and enlarge. Furthermore, the wrapper fabric binds together all the layers of rubber and holds them together under treatment. In constructions which operate by pushing in by hand the connection between the mandrel or tube, the spring which customarily holds the mandrel bearing in place is apt to weaken and loosen, causing the mandrels to fall out. This defect is avoided by providing the air piston grip which I have disclosed. This air piston grip also enables me to use any size of mandrel and to secure great uniformity of action.

By means of the construction which I have shown and described I am enabled to operate my cone-bearing directly by air. That is to say, the cone-bearing is connected by the piston-rod with the piston so that in a very simple manner the cone-bearing is operated by the air pressure. I find it also efficient to have an ordinary clutch at one end and to have the same treadle operate both cone-bearings simultaneously. This arrangement is peculiarly effective in an apparatus like mine in which the rolls are removed after each operation so that the clutch must be moved back from one end and the cone-bearing pushed or drawn back from the other end to entirely free the tube mandrel.

Having fully described my invention, what I claim is:—

1. In a tube-wrapping machine the combination with a removable tube mandrel, of a separable cone-bearing at one end of the mandrel, a clutch at the other end, a piston and piston-rod connected with the cone-bearing, an air supply for pressing the cone into close engagement with the mandrel to prevent it slipping and means for operating the air supply, and means for operating the clutch.

2. In a tube-wrapping machine, the combination of a removable tube mandrel, a vertically disposed air cylinder, a transverse cylinder communicating with the air cylinder, a separable cone-bearing connected with the piston in the transverse cylinder, a clutch at the opposite end of the mandrel, and means for simultaneously operating the clutch and the governing parts of the air supply.

In testimony whereof I have hereunto signed my name.

IRVIN ZWISLER.